United States Patent
Udupa et al.

(10) Patent No.: US 11,423,448 B2
(45) Date of Patent: Aug. 23, 2022

(54) METHOD AND APPARATUS FOR FACILITATING INTERACTION WITH CUSTOMERS ON ENTERPRISE INTERACTION CHANNELS

(71) Applicant: [24]7.ai, Inc., San Jose, CA (US)

(72) Inventors: Rajagopala Udupa, Bangalore (IN); Anil Prabhu, Bangalore (IN)

(73) Assignee: [24]7.ai, Inc, Campbell, CA (US)

(*) Notice: Subject to any disclaimer, the term of this patent is extended or adjusted under 35 U.S.C. 154(b) by 518 days.

(21) Appl. No.: 16/396,295

(22) Filed: Apr. 26, 2019

(65) Prior Publication Data
US 2019/0340658 A1    Nov. 7, 2019

Related U.S. Application Data

(60) Provisional application No. 62/668,083, filed on May 7, 2018.

(51) Int. Cl.
*G06Q 30/02*     (2012.01)
*G06F 16/954*    (2019.01)
*G06Q 30/00*     (2012.01)

(52) U.S. Cl.
CPC ....... *G06Q 30/0281* (2013.01); *G06F 16/954* (2019.01); *G06Q 30/016* (2013.01); *G06Q 30/0239* (2013.01); *G06F 2216/15* (2013.01)

(58) Field of Classification Search
CPC ............. G06Q 30/0281; G06Q 30/016; G06Q 30/0239; G06F 16/954; G06F 2216/15
See application file for complete search history.

(56) References Cited

U.S. PATENT DOCUMENTS 7,941,755 B2 *   5/2011  Siegrist ............... G06F 9/45512
                                                           715/760
8,051,178 B2 *  11/2011  Skidgel ................. G06F 16/954
                                                           709/227

(Continued)

FOREIGN PATENT DOCUMENTS

WO     2014014695 A1    1/2014
WO     2014124333 A1    8/2014

OTHER PUBLICATIONS

Instant Co-Browsing: Lightweight Real-Time Collaborative Web Browsing Mitsubishi Electric Research Laboratories Alan W. Esenther May 2002; Pertinent pp. 1-4 (Year: 2002).*

(Continued)

*Primary Examiner* — Alexandru Cirnu
(74) *Attorney, Agent, or Firm* — Perkins Coie LLP; Michael Glenn

(57) ABSTRACT

A method and apparatus for facilitating interactions between customers and agents are disclosed that include detecting whether a customer is present on a website related to an enterprise. The detection is performed subsequent to an initiation of an interaction with an agent by the customer. When the customer is detected to be present, an option is provided to the agent to offer co-browsing of the web site to the customer. In response to an acceptance of the offer by the customer, a co-browsing session is initiated for facilitating the co-browsing of the website. Digital content is generated based on at least one of the ongoing co-browsing session and the interaction between the customer and the agent and display of the digital content by the agent to the customer is caused. The digital content is displayed during the ongoing co-browsing session to provide assistance to the customer.

20 Claims, 8 Drawing Sheets

(56) References Cited

U.S. PATENT DOCUMENTS

| | | | |
|---|---|---|---|
| 9,256,691 B2* | 2/2016 | Handrigan | G06F 16/954 |
| 9,275,342 B2 | 3/2016 | Vijayaraghavan et al. | |
| 9,736,214 B2* | 8/2017 | Mendez | G06F 40/143 |
| 2014/0129622 A1* | 5/2014 | Michaeli | G06F 16/954 |
| | | | 709/203 |
| 2014/0258889 A1* | 9/2014 | Badge | G06F 16/954 |
| | | | 715/760 |
| 2017/0013073 A1 | 1/2017 | Mendez et al. | |

OTHER PUBLICATIONS

Fan Wu, et al., "Prediction of the Intention of Purchase of the User Surfing on the Web Using Hidden Markov Model", Proceedings of ICSSSM'05 2005 International Conference on services systems and services Management, Jun. 13-15, 2005, vol. 1, pp. 387-390. URL: https://ieeexplore.ieee.org/document/1499501.

* cited by examiner

METHOD AND APPARATUS FOR FACILITATING INTERACTION WITH CUSTOMERS ON ENTERPRISE INTERACTION CHANNELS

CROSS REFERENCE TO RELATED APPLICATIONS

This application claims priority to U.S. provisional patent application Ser. No. 62/668,083, filed May 7, 2018, which is incorporated herein in its entirety by this reference thereto.

TECHNICAL FIELD

The present technology generally relates to interactions between enterprises and customers of the enterprises, and more particularly to a method and apparatus for facilitating interaction with customers on enterprise interaction channels.

BACKGROUND

Enterprises may engage with existing and potential customers to draw the customer's attention towards a product or a service, to provide information about an event of customer interest, to offer incentives and discounts, to solicit feedback, to provide billing related information etc.

Similarly, the customers may engage with the enterprises to enquire about products/services of interest, to resolve concerns, to make payments, to lodge complaints, etc. The interactions may be conducted over a plurality of interaction channels, such as a Web channel, a voice channel, a chat channel, an Interactive Voice Response (IVR) channel, a social media channel, a native mobile application channel, and the like.

In many example scenarios, the interactions between the enterprise and the customers may be conducted over multiple interaction channels in a disjointed manner. Further, in several cases, the agent and the customer may have to interact multiple times to provide the desired assistance to the customer.

In an illustrative example, a customer who is currently browsing an enterprise website may be presented with content, such as an advertisement or a promotional offer, based on the browsing activity of the customer on the website. The customer may be interested in acquiring more information on the presented content. In such a scenario, a customer may have to engage in a voice call interaction with a customer support representative, also referred to herein as an 'agent,' to seek additional information regarding the digital content displayed on the website. Accordingly, the customer may engage in an interaction with the agent over a voice or a chat channel while also being present on the website, i.e. a Web interaction channel. The agent may answer the queries of the customer and thereafter the customer may be requested to return to the website to initiate a purchase transaction. The customer may return to the website to initiate the purchase transaction but may face an issue in completing the purchase transaction on the website. In such a scenario, the customer may choose to not seek agent assistance again and exit the website.

Such disjointed and to-and-fro communication on multiple interaction channels may ruin a quality of customer experience afforded to the customer. In some cases, the customer may choose to not return to the website again, thereby leading to a loss of revenue for the enterprise.

Accordingly, there is a need to facilitate interaction with customers on enterprise interaction channels while precluding to-and-fro or disjointed communication between the enterprise and the customers over multiple interaction channels.

SUMMARY

In an embodiment of the invention, a computer-implemented method for facilitating interactions between customers and agents of an enterprise is disclosed. The method detects, by a processor, whether a customer is present on a website related to the enterprise. The detection is performed subsequent to an initiation of an interaction with an agent by the customer. If the customer is detected to be present on the web site, the method provides by the processor, an option to the agent to offer co-browsing of the web site to the customer. In response to an acceptance of the offer by the customer, the method initiates by the processor, a co-browsing session for facilitating the co-browsing of the web site by the customer and the agent. The method generates, by the processor, digital content based on at least one of the ongoing co-browsing session and the interaction between the customer and the agent. The method causes, by the processor, display of the digital content by the agent to the customer. The digital content displayed during the ongoing co-browsing session to provide assistance to the customer.

In an embodiment of the invention, an apparatus for facilitating interactions between customers and agents of an enterprise is disclosed. The apparatus includes a processor and a memory. The memory stores instructions. The processor is configured to execute the instructions and thereby cause the apparatus to detect whether a customer is present on a website related to the enterprise. The detection is performed subsequent to an initiation of an interaction with an agent by the customer. If the customer is detected to be present on the website, the apparatus provides an option to the agent to offer co-browsing of the web site to the customer. In response to an acceptance of the offer by the customer, the apparatus initiates a co-browsing session for facilitating the co-browsing of the web site by the customer and the agent. The apparatus generates digital content based on at least one of the ongoing co-browsing session and the interaction between the customer and the agent. The apparatus causes display of the digital content by the agent to the customer. The digital content is displayed during the ongoing co-browsing session to provide assistance to the customer.

In an embodiment of the invention, another computer-implemented method for facilitating interactions between customers and agents of an enterprise is disclosed. The method receives, by a processor, a request to interact with an agent from a customer. The request for interaction is provided by the customer on a website related to the enterprise. The method facilitates, by the processor, a chat interaction between the customer and the agent on the website. The method provides, by the processor, an option to the agent to offer co-browsing of the website to the customer. In response to an acceptance of the offer by the customer, the method initiates by the processor, a co-browsing session for facilitating the co-browsing of the web site by the customer and the agent. A current activity of the customer on the website is mirrored on an agent's device subsequent to initiation of the co-browsing session to facilitate the co-browsing of the website. The method generates, by the processor, digital content based on at least one of the ongoing co-browsing session and the interaction between the customer and the agent. The method causes, by the processor, display of the digital content by the agent to the customer. The digital content is displayed during the ongoing co-browsing session to provide assistance to the customer.

DETAILED DESCRIPTION

The detailed description provided below in connection with the appended drawings is intended as a description of the present examples and is not intended to represent the only forms in which the present example may be constructed or used. However, the same or equivalent functions and sequences may be accomplished by different examples.

Figure 1:
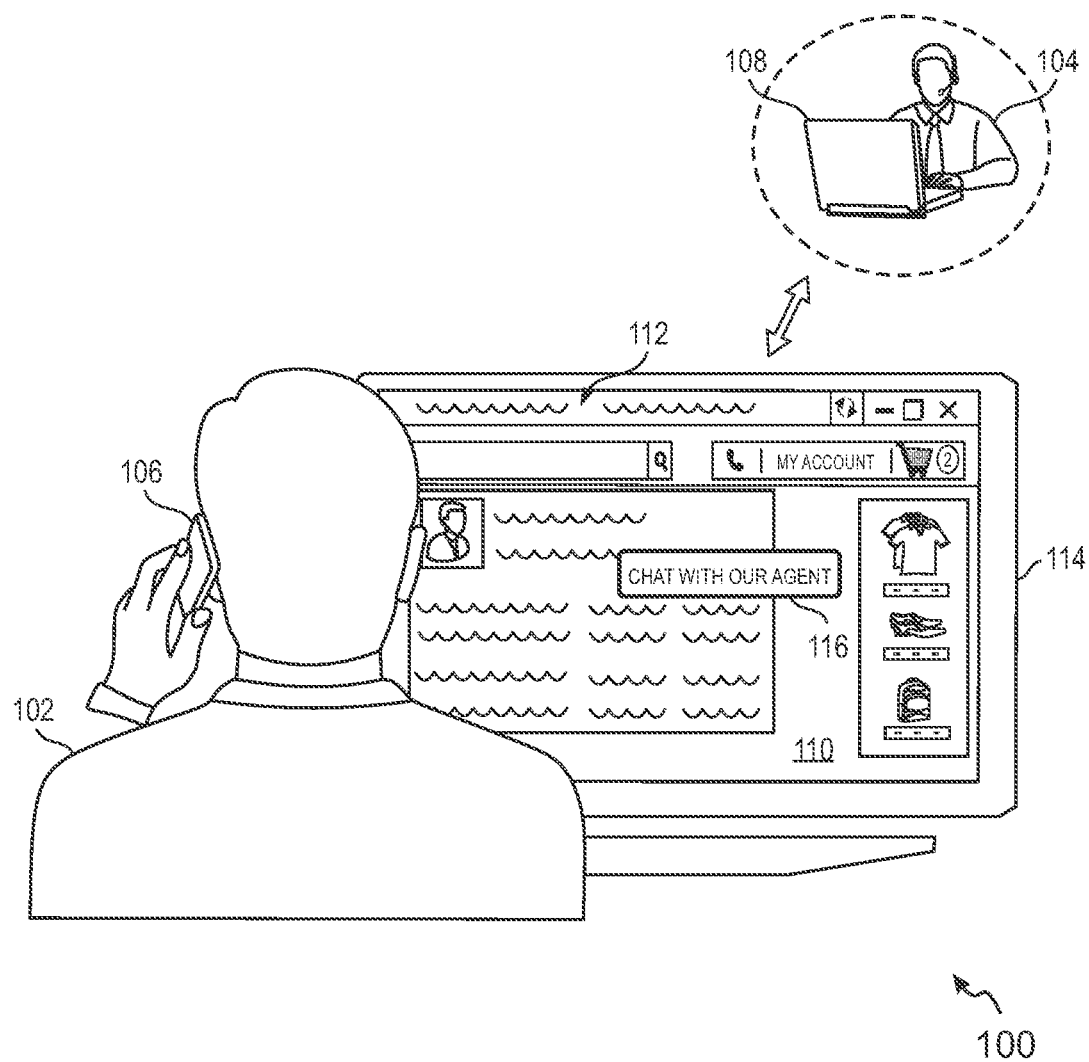
FIG. 1 shows a representation for illustrating an interaction between a customer and an agent associated with an enterprise in accordance with an example scenario.

FIG. 1 shows a representation 100 for illustrating an interaction between a customer and an agent associated with an enterprise, in accordance with an example scenario.

The term 'enterprise' as used throughout the description may refer to a corporation, an institution, a small/medium sized company or even a brick and mortar entity. For example, the enterprise may be a banking enterprise, an educational institution, a financial trading enterprise, an aviation company, a consumer goods enterprise or any such public or private sector enterprise. The enterprise may be associated with potential and existing users of products, services and/or information offered by the enterprise. Such existing or potential users of enterprise offerings are referred to herein as customers of the enterprise. The representation 100 depicts one example customer of an enterprise as a customer 102 for illustration purposes.

Most enterprises, nowadays, extend dedicated customer support facility to their customers. A typical customer support center may include a number of customer service representatives, such as human agents, chat bots, self-assist systems, such as either Web or mobile digital self-service, and/or Interactive Voice Response (IVR) systems. The customer support representatives, also referred to herein as agents, are trained to interact with the customers for providing information to the customers, selling to them, answering their queries, addressing their concerns, and/or resolving their issues. The representation 100 depicts one example agent associated with the enterprise as an agent 104.

The representation 100 further depicts the customer 102 to be interacting with the agent 104 using a mobile device 106. The agent 104 operates an agent device 108. The customer 102 is also depicted to be accessing a website 110 using a Web browser application 112 on a customer device 114. The customer device 114 is depicted as a desktop computer for illustration purposes. The customer device 114 is not limited to a desktop computer and may include any electronic device capable of connecting to a communication network (not shown in FIG. 1), such as the Internet, for facilitating Web access and for communicating with other devices connected to the communication network. Some non-exhaustive examples of the customer device 114 include, but are not limited to, a smartphone, a tablet, a laptop, a personal digital assistant (PDA), a wearable device, etc. Similarly, the agent device 108 may also be embodied as any of the devices mentioned above.

The website 110 serves as a Web interaction channel provided by the enterprise for selling goods, services and enterprise information to customers, such as the customer 102. The website 110 may be hosted on a remote Web server (not shown in FIG. 1) and the Web browser application 112 may be configured to retrieve one or more Web pages associated with the website 110 from the remote Web server over the communication network. The website 110 may attract a large number of existing and potential customers, such as the customer 102.

In the representation 100, the website 110 is exemplarily depicted to be an electronic commerce Website displaying a variety of products and services for sale to online visitors during their journey on the website 110. The term 'journey' as used throughout the description refers to a path, a customer such as the customer 102 may take to reach a conclusion when using an enterprise interaction channel, such as a website or an Interactive Voice Response (IVR) channel. For example, a Web journey of the customer 102 on the website 110 may include navigating through several Web pages and decision points that carry the online interaction on the website 110 from one step to another.

As explained above, the agent 104 may be tasked by the enterprise to provide support to customers on one or more interaction channels. The agent 104 is present at a remote customer support center and can be reached through phone or chat interaction channels. For example, the customer 102 may contact the agent 104 over phone while browsing the website 110. Alternatively, the agent 104 and the customer

102 may communicate with each other using the chat medium. A widget 116 exemplarily depicted to be showing text 'CHAT WITH OUR AGENT' is displayed on the website 110. A customer selection of the widget 116 may initiate a chat conversation with an agent, such as the agent 104.

In one illustrative example, the customer 102 may have purchased a product from the enterprise using the enterprise website 110. The product may have been delivered to the customer 102 with the seal broken and a damaged part. The customer 102 may wish to lodge a complaint, return the damaged product, and/or seek a refund on the purchase. Accordingly, the customer 102 may initiate a voice call interaction with an agent, such as the agent 104, by dialing a phone number associated with the customer support center provided by the enterprise on the website 110. During the call, the customer 102 may lodge a complaint and request assistance from the agent 104 to seek a refund on the purchased product. The agent 104 may request the customer 102 to send an Email regarding the issue along with a picture of the shipment. In some example scenarios, the customer 102 may also engage in a chat interaction with the agent 104 on the website 110 instead of engaging in a voice call interaction with the agent 104.

In the illustrative example mentioned above, the customer 102 has to interact with the enterprise over two separate channels, i.e. the Web interaction channel or the website 110 to get the contact information, and voice or chat interaction channel. The customer 102 has to explain the context to the agent 104 of why the product is being returned and seek desired assistance. Further, the customer 102 may also have to engage in several email exchanges to seek refund on the purchased product or place the delivery order again, which is cumbersome for the customer 102.

In another illustrative example, the customer 102 may be browsing the enterprise website 110 on the customer device 114. Based on the activity of the customer 102 on the website 110, content in form of a promotional offer may be displayed to the customer 102. The customer 102 may wish to seek more information on the offer. Accordingly, the customer 102 may initiate a voice-call interaction or a chat interaction with the agent 104. The agent 104 may answer the queries of the customer 102 and thereafter the customer 102 may be requested to return to the website 110 to complete the purchase transaction. In some cases, though the customer 102 may return to the website 110 to complete the purchase transaction, on facing an issue in completing the transaction, the customer 102 may choose to not seek agent assistance again and exit the website 110.

The interactions between the customers and the enterprises are conducted over multiple interaction channels in a disjointed manner. The disjointed and/or to-and-fro communication between the enterprise and the customers ruins a quality of interaction experience afforded to the customers. In many cases, the customers may choose to not engage with the enterprise again, leading to a loss of revenue for the enterprise. Furthermore, there is no mechanism for the agent 104 to display products with similar offers or upsell related products to the customer 102 if the customer 102 is not interested in the displayed promotional offer.

Various embodiments of the invention provide a method and an apparatus that are capable of overcoming the above obstacles and providing additional advantages. More specifically, various embodiments disclosed herein provide a method and apparatus for facilitating interactions with customers on enterprise interaction channels, while precluding disjointed or to-and-fro communication on multiple interaction channels. In at least one example embodiment, the apparatus is configured to facilitate co-browsing of Web content by a customer and agent. Moreover, the apparatus is configured to enable the agent to push personalized digital content (also referred to herein as 'cards'), such as personalized product offers, during the co-browsing session. As a result, of combining co-browsing with sharing of personalized digital content in a single session, a quality of interaction experience is improved manifold. For example, in the first illustrative example explained above, the customer 102 and the agent 104 may co-browse the website 110 and the customer 102 can share an image of the damaged product to the agent 104 on the website 110 itself. The agent 104 may then assist the customer 102 in lodging the complaint by prefilling the form fields in a Web complaint form and also help the customer 102 in placing the order again.

Similarly, in the second illustrative example, the agent 104 and the customer 102 may co-browse the website 110 while interacting on the phone. The agent 104 may push digital content such as a discount coupon or show accessories related to the product being showcased in the promotional offer during the co-browsing session to facilitate execution of the purchase transaction. Accordingly, such facilitating of customer interactions on enterprise interaction channels improves a quality of interaction experience for the customers and also contributes to an increase in sale of goods and services offered for sale by the enterprise. An apparatus for facilitating interactions with customers on enterprise interaction channels is explained next with reference to FIG. 2.

Figure 2:
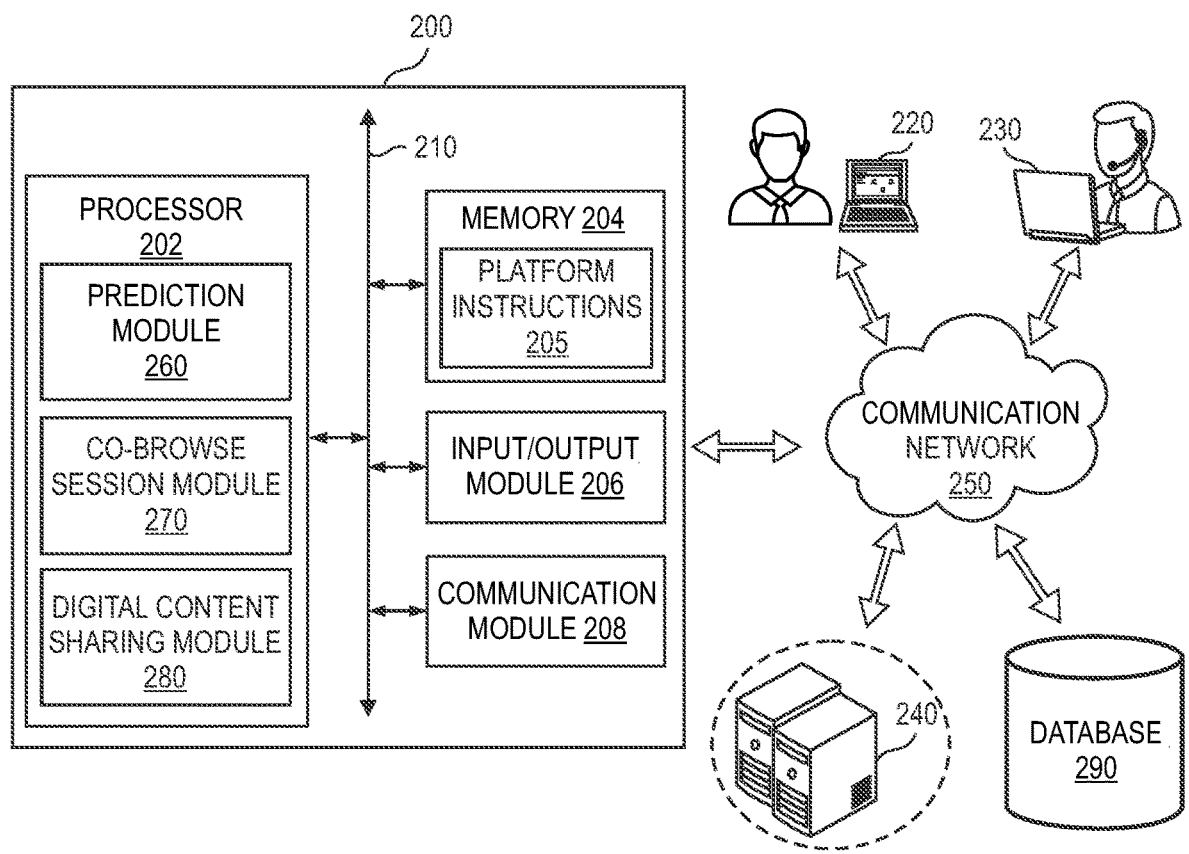
FIG. 2 is a block diagram of an apparatus configured to facilitate interactions between customers and agents of an enterprise in accordance with an embodiment of the invention.

FIG. 2 is a block diagram of an apparatus 200 configured to facilitate interactions between customers and agents of an enterprise in accordance with an embodiment of the invention. As explained with reference to FIG. 1, the term 'customer' as used herein refers to any existing or potential user of enterprise offerings such as products, services and/or information offered by the enterprise. The term 'agent' as used hereinafter, generally, refers to a human assistant, however, an agent may also imply a virtual/machine assistant or a chatbot. The term 'facilitating interactions between customers and agents' as used herein implies enabling interaction between customers of the enterprise and agents of the enterprise on multiple enterprise interaction channels, while providing improved interaction experience to the customers. The term 'enterprise interaction channels' refers to various mediums offered by the enterprise for enabling its customers to engage in interaction with the enterprise. For example, the enterprise interaction channels include Web interaction channel or the Website, chat interaction channel, voice or speech interaction channel, IVR channel, native mobile application channel, social media channel, and the like.

In one embodiment, the apparatus 200 is embodied as an interaction platform with one or more components of the apparatus 200 implemented as a set of software layers on top of hardware systems. In an illustrative example, the interaction platform may communicate over a communication network, such as the Internet, with a Web server deployed at a remote customer support center to receive information related to agent-customer interactions in an on-going manner in substantially real-time. In another illustrative example, the interaction platform may be in operative communication with servers associated with enterprise interaction channels, such as a server hosting an enterprise website to receive information related to customer activity on the website in substantially real-time.

The apparatus 200 includes at least one processor, such as a processor 202 and a memory 204. Although the apparatus 200 is depicted to include only one processor, the apparatus 200 may include a greater number of processors therein. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The processor 202 is depicted to include a prediction module 260, a co-browse session module 270, and a digital content sharing module 280. In some example embodiments, the processor 202 may preclude the various modules and is configured to perform all the functions that are collectively performed by the prediction module 260, the co-browse session module 270, and the digital content sharing module 280. Various modules of the processor 202 are depicted herein for example purposes and that the processor 202 may include fewer or more modules than those depicted in FIG. 2. The plurality of modules of the processor 202 are configured to facilitate interactions between customers and agents of the enterprise, as will be explained in detail later.

In an embodiment, the memory 204 stores machine executable instructions, referred to herein as platform instructions 205. Further, the processor 202 is capable of executing the platform instructions 205. More specifically, the memory 204 stores logic and instructions for use by the various modules of the processor 202 to perform respective functions for facilitating interactions between customers and agents of the enterprise. For example, the memory 204 is configured to store one or more text mining algorithms and classifiers for use by the prediction module 260 for facilitating prediction of customer intentions. Some examples of classifiers include machine learning models based on logistic regression, artificial neural network (ANN), Support Vector Machine (SVM) with Platt scaling, and the like.

The memory 204 may be embodied as one or more volatile memory devices, one or more non-volatile memory devices, and/or a combination of one or more volatile memory devices and non-volatile memory devices. For example, the memory 204 may be embodied as semiconductor memories, such as mask ROM, PROM (programmable ROM), EPROM (erasable PROM), flash memory, RAM (random access memory), etc.; magnetic storage devices, such as hard disk drives, floppy disks, magnetic tapes, etc.; optical magnetic storage devices, e.g. magneto-optical disks, CD-ROM (compact disc read only memory), CD-R (compact disc recordable), CD-R/W (compact disc rewritable), DVD (Digital Versatile Disc), and BD (BLU-RAY® Disc).

The apparatus 200 also includes an input/output module 206 (hereinafter referred to as an 'I/O module 206') and at least one communication module, such as a communication module 208. In an embodiment, the I/O module 206 may include mechanisms configured to receive inputs from and provide outputs to the user of the apparatus 200. The term 'user of the apparatus 200' as used herein refers to any individual or groups of individuals assigned with operating the apparatus 200 for facilitating interactions between customers and agents of the enterprise. In an illustrative example, an enterprise may employ several data scientists, Machine Learning (ML) and/or Artificial Intelligence (AI) analysts, Information Technology (IT) professionals, scientists, and researchers for configuring and operating the apparatus 200 embodied as an interaction platform.

To enable reception of inputs and provide outputs to the user of the apparatus 200, the I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

The communication module 208 is configured to facilitate communication between the apparatus 200 and one or more remote entities over a communication network, such as a communication network 250. For example, the communication module 208 is capable of facilitating communication with electronic devices of customers, with electronic devices of agents, and the like. Accordingly, FIG. 2 shows the apparatus 200 to be in operative communication with an example electronic device 220 associated with the customer and an example electronic device 230 associated with the agent over the communication network 250. The communication module 208 is also configured to set-up and maintain end-to-end connection between Web browsers associated with the agent's electronic device 230 and the customer's electronic device 220 to facilitate co-browsing of Web content. In a co-browsing session, the browsing activity on one electronic device, for example the agent's electronic device 230 or the customer's electronic device 220, is mirrored on the other electronic device, i.e. on the customer's electronic device 220 or the agent's electronic device 230. The agent can see what the customer is browsing through mirroring of content and guide the customer to relevant content or push customized offers during the co-browsing session to assist the customer.

In one embodiment, the communication module 208 includes several channel interfaces to receive information from a plurality of enterprise interaction channels. Each channel interface may be associated with a respective communication circuitry such as, for example, a transceiver circuitry including antenna and other communication media interfaces to connect to the communication network 250. The communication circuitry associated with each channel interface may, in at least some example embodiments, enable transmission of data signals and/or reception of signals from remote network entities, such as Web servers hosting enterprise website or a server at a customer support center configured to maintain real-time information related to interactions between customers and agents. As an illustrative example, FIG. 2 shows the apparatus 200 to be in operative communication with a Web server 240 configured to host the enterprise web site.

In at least one example embodiment, the channel interfaces are configured to receive up-to-date information related to the customer-enterprise interactions from the enterprise interaction channels. For example, the communication module 208 is configured to receive information related to customer interactions with conversational agents, such as voice or chat interactions between customers and conversational agents, for example automated conversational agents or live agents, being conducted using various interaction channels in real-time and provide the information to the processor 202. In at least some embodiments, the communication module 208 may include relevant Application Programming Interfaces (APIs) to communicate with remote data gathering servers associated with such enterprise interaction channels over the communication network 250. The communication network 250 may be embodied as a wired communication network, for example Ethernet, local area network (LAN), etc.; a wireless communication network, for example a cellular network, a wireless LAN, etc.; or a combination thereof, for example the Internet.

The apparatus 200 is depicted in operative communication with a database 290. The database 290 is any computer-operated hardware suitable for storing and/or retrieving data such as, but not limited to, a registry of human agents, a registry of standard and specialized VAs, digital content capable of being displayed on the enterprise interaction channels such as, for example, information snippets, banner advertisements, and widgets offering agent support among other content related to promotional offers, discount coupons, etc. The database 290 may include multiple storage units, such as hard disks and/or solid-state disks in a redundant array of inexpensive disks (RAID) configuration. The database 290 may include a storage area network (SAN) and/or a network attached storage (NAS) system. The database 290 may be accessed by the apparatus 200 using a storage interface (not shown in FIG. 2). The storage interface is any component capable of providing the processor 202 with access to the database 290. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 202 with access to the database 290. Although the database 290 is depicted to be located external to the apparatus 200, in some embodiments, the database 290 is integrated within the apparatus 200. For example, the apparatus 200 may include one or more hard disk drives as the database 290.

In an embodiment, various components of the apparatus 200, such as the processor 202 and the various modules of the processor 202, the memory 204, the I/O module 206, and the communication module 208 are configured to communicate with each other via or through a centralized circuit system 210. The centralized circuit system 210 may be various devices configured to, among other things, provide or enable communication between the components (202-208) of the apparatus 200. In certain embodiments, the centralized circuit system 210 may be a central printed circuit board (PCB), such as a motherboard, a main board, a system board, or a logic board. The centralized circuit system 210 may also, or alternatively, include other printed circuit assemblies (PCAs) or communication channel media The apparatus 200 as illustrated and hereinafter described is merely illustrative of an apparatus that could benefit from embodiments of the invention and, therefore, should not be taken to limit the scope of the invention. The apparatus 200 may include fewer or more components than those depicted in FIG. 2. In an embodiment, one or more components of the apparatus 200 may be deployed in a Web Server or in a Cloud Infrastructure. In another embodiment, the apparatus 200 may be a standalone component in a remote machine connected to a communication network and capable of executing a set of instructions, sequential and/or otherwise, to facilitate interactions between customers and agents of the enterprise. Moreover, the apparatus 200 may be implemented as a centralized system or, alternatively, the various components of the apparatus 200 may be deployed in a distributed manner while being operatively coupled to each other. In an embodiment, one or more functionalities of the apparatus 200 may also be embodied as a client within devices, such as agents' devices. In another embodiment, the apparatus 200 may be a central system that is shared by or accessible to each of such devices.

In at least one example embodiment, the processor 202 is configured to receive a request to interact with an agent from a customer. In an example scenario, a customer may initiate a voice call interaction by calling a customer support center associated with the enterprise. In at least some embodiments, the communication module 208 may be configured to receive such a request for interaction from the customer and forward the request to the processor 202. The prediction module 260 of the processor 202 may be configured to use initial interaction handling logic stored in the memory 204 and, in conjunction with the registry of agents stored in the database 290, determine a suitable human agent for interacting with the customer. In another embodiment, a high-level intent may be predicted based on the customer's current and/or past interaction history and the human agent capable of handling customers for the predicted intent may be selected for conducting the interaction with the customer. In yet another embodiment, a customer's persona may be predicted based on current and past journeys of the customer on the enterprise interaction channels, and an agent more suited to a customer's persona type may be selected for conducting the interaction with the customer. The selected agent may thereafter engage in the interaction with the customer.

The prediction module 260 is further configured to detect whether a customer is present on a website related to the enterprise subsequent to an initiation of an interaction with an agent by the customer. The detection of the presence of the customer on the enterprise website is explained hereinafter.

In an illustrative example, a customer may enter a uniform resource locator (URL) associated with the enterprise website in a Web browser application to provision a hypertext transfer protocol (HTTP) request to the Web server, such as the Web server 240, for accessing a Web page associated with an enterprise Website. In response to the HTTP request, the Web server may be configured to provision a Web page, for example home page associated with the enterprise Website, to the customer's device, which may then display the Web page in the UI associated with the Web browser application. The providing of the Web page (or Web pages) may be recorded at the Web server. As explained above, the communication module 208 of the apparatus 200 is operatively coupled with Web servers and other data gathering servers. The communication module 208 may receive information related to the customer's request and subsequent provisioning of the Web page from the Web server and provide such information to the processor 202 (or more specifically to the prediction module 260), which may be configured to detect presence of the customer on the enterprise Website. The processor 202 may be configured to similarly detect presence of customers in other interaction channels, such as social media channel, chat interaction channels, and the like.

If the customer is detected to be present on the website, the prediction module 260 is configured to signal such information, for example by using an API call, to the co-browse session module 270 included within the processor 202. In at least one embodiment, the co-browse session module 270 is configured to provide an option to the agent to offer co-browsing of the website to the customer. The option provided to the agent for offer co-browsing of the website to the customer is depicted using an example representation in FIG. 3.

Figure 3:
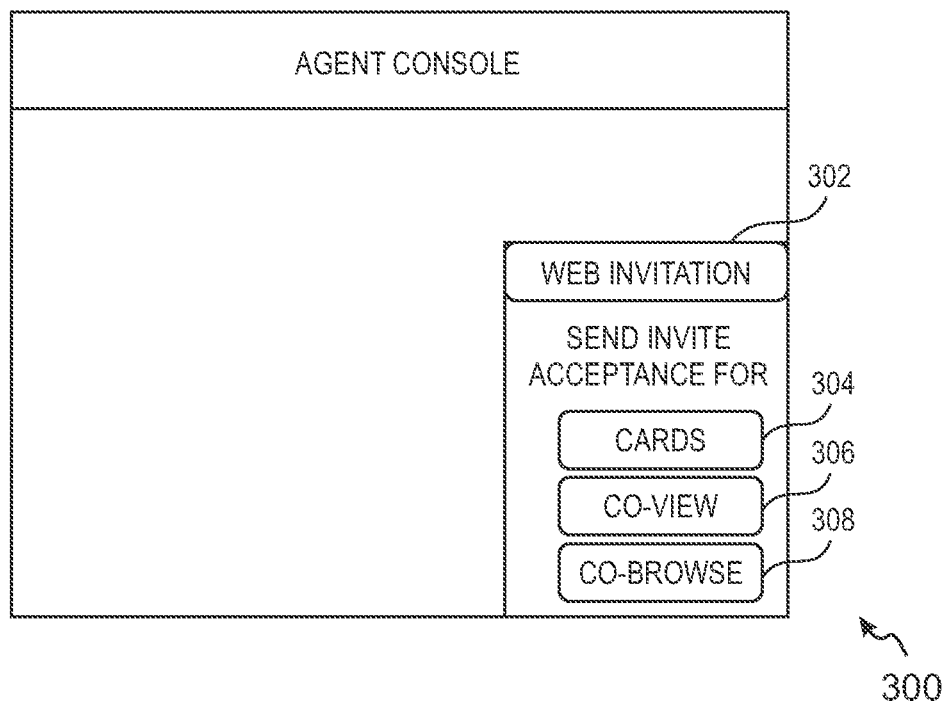
FIG. 3 shows a simplified representation of an agent console for illustrating an option provided to the agent for offering co-browsing of the website to the customer in accordance with an embodiment of the invention.

FIG. 3 shows a simplified representation of an agent console 300 for illustrating an option provided to the agent for offering co-browsing of the website to the customer in accordance with an embodiment of the invention. The term 'agent console' as used herein refers to a digital interface used by an agent to interact with customers, such as customers detected to be present on the enterprise website.

As explained with reference to FIG. 2, in many example scenarios, a customer who has initiated a voice call interaction with an agent to seek assistance may also be simultaneously present in the Web interaction channel, i.e. on the enterprise website. The presence of the customer on the website is detected as explained with reference to FIG. 2. The presence of the customer on the website is notified to the agent on the agent console 300 by the apparatus 200 using the communication module 208. Further, an option in the form of button to offer co-browsing of the website is also displayed in the agent console 300, as explained hereinafter.

The agent console 300 is depicted to display a widget box 302 showing three buttons 304, 306, and 308 displaying text 'CARDS', 'CO-VIEW,' and 'CO-BROWSE', respectively. A simplified representation of the agent console 300 is shown in FIG. 3. The agent console 300 may include several partitions with multiple menu options configured to enable the agent to chat with customers, seek recommendations from supervisors, receive predicted intentions on a real-time basis, and the like, which are not shown in FIG. 3. If the agent, based on the agent's voice call interaction with the customer, is of the opinion that the customer may be better served with continued interaction on the website, then the agent may provide a touch or a click input on the button 308 to offer, i.e. provide an invite, to the customer for initiating a co-browsing session. An example co-browsing session invite displayed to the customer on the customer's electronic device is shown in FIG. 4.

Figure 4:
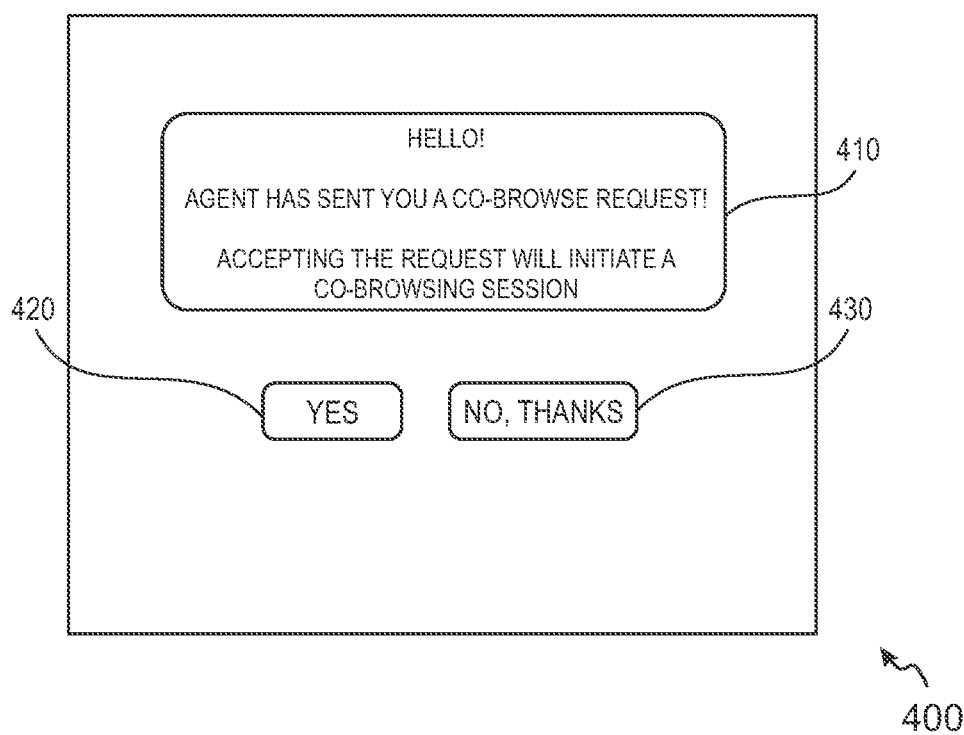
FIG. 4 shows a simplified representation of a notification displayed to the customer for seeking the customer's approval for initiating a co-browsing session in accordance with an embodiment of the invention.

FIG. 4 shows a simplified representation of a notification 400 displayed to the customer for seeking the customer's approval for initiating a co-browsing session in accordance with an embodiment of the invention. The notification 400 is displayed on a UI associated with the enterprise Website being displayed on the customer's electronic device. As explained with reference to FIG. 3, an agent may wish to initiate a co-browsing session to better assist the customer currently engaged in a voice call interaction with the agent. The voice call interaction may be initiated by the customer while being simultaneously present on the enterprise Website. The agent may select a button, such as the button 308 displayed in the agent console 300 shown in FIG. 3, to provide a co-browsing session invite to the customer. The co-browsing session invite, i.e. the notification, may be provided as the pop-up notification on the Website UI being currently viewed by the customer. The notification 400 is configured to display a text snippet 410 stating 'HELLO! AGENT HAS SENT YOU A CO-BROWSE REQUEST! ACCEPTING THE REQUEST WILL INITIATE A CO-BROWSING SESSION.' Further, the notification 400 is depicted to display two buttons 420 and 430, displaying text 'YES' and 'NO, THANKS,' respectively. The customer may provide a touch or a click input on the button 420 to provision an acceptance for initiating the co-browsing session. The button 430 may be selected by the customer to decline the invitation for initiating the co-browsing session.

The acceptance of the offer to co-browse the website as provided by the customer on the website using the customer's electronic device may be received by the communication module 208 of the apparatus 200 (shown in FIG. 2). The communication module 208 may be confirmed to signal the acceptance of the offer to the co-browse session module 270. In response to an acceptance of the offer by the customer, the co-browse session module 270 initiates a co-browsing session for facilitating the co-browsing of the website by the customer and the agent. More-specifically, the co-browse session module 270 is configured to initiate an end-to-end connection between the browsers in the agent's electronic device (hereinafter referred to as an agent device) and the customer's electronic device (hereinafter referred to as a customer device) to facilitate a co-browsing session between the customer and the agent. More specifically, the co-browse session module 270 is configured to implement a proxy-based HTML passing connection between the browsers in the customer device and the agent device, such that a Web page (also referred to herein as a hypertext markup language or HTML page) being displayed on the customer device and all subsequent browsing activity being performed on the customer device is mirrored on the agent device and vice versa. The mirroring of the Web activity is further explained with reference to FIGS. 5A and 5B.

Figure 5A:
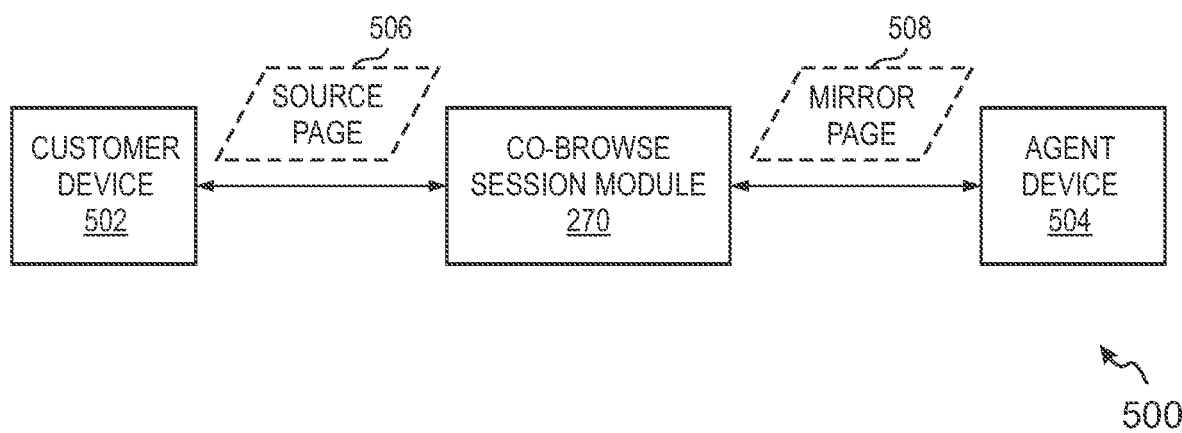
FIG. 5A depicts a block diagram representation to illustrate an example mirroring of Web session content in a co-browsing session in accordance with an embodiment of the invention.

Referring now to FIG. 5A, a block diagram representation 500 is depicted to illustrate an example mirroring of Web session content in a co-browsing session in accordance with an embodiment of the invention.

As explained above, the co-browse session module 270 is configured to set-up and maintain a co-browsing session between a customer device and an agent device. In at least one example embodiment, a JavaScript (JS) snippet is included within the enterprise website. The JS snippet is configured to proxy the Cascading Style Sheets (CSS) and pass the HTML information from the browser in the customer device to the browser in the agent device to facilitate collaborative browsing, which is referred to as 'co-browsing' in the description. The JS snippet may be activated using an API call by the co-browse session module 270 subsequent to receiving the customer acceptance to the offer to co-browse the website.

Accordingly, the block diagram representation 500 shows a customer device 502 and an agent device 504 to be connected to each other by the co-browse session module 270. In the block diagram representation 500, the Web page content viewed on the customer device 502 is shown as a source page 506. The source page 506 is mirrored by the co-browse session module 270 and the mirrored content, shown as a mirror page 508, is displayed on the agent device 504. The term 'mirror' or 'mirrored content' as used herein merely implies a passing of information of the UI and UI related activity between browsers and is not related to data mirroring or data proxying technologies used for data backup and such other activities.

Each customer activity on the source page 506, such as cursor movement, selection of an image, up-scrolling and down-scrolling of content, selection of drop-down menus, etc. is also displayed in substantially real-time, i.e. with negligible delay, on the agent device 504. Although the Web session content is depicted to be mirrored from the customer device 502 onto the agent device 504, in some example scenarios, the Web activity being performed on the agent device 504 may be mirrored onto the customer device 502. Such a scenario may arise when the agent intends to show how to access a particular piece of information on the website, how to fill up a Web form, and the like. In some cases, the Web activity may be mirrored on the customer device or the agent device to share additional digital content, such as offers etc. on the Website, as will be explained in further detail later. The mirroring of Web activity from the agent device 504 onto the customer device 502 is exemplarily illustrated in FIG. 5B.

Figure 5B:
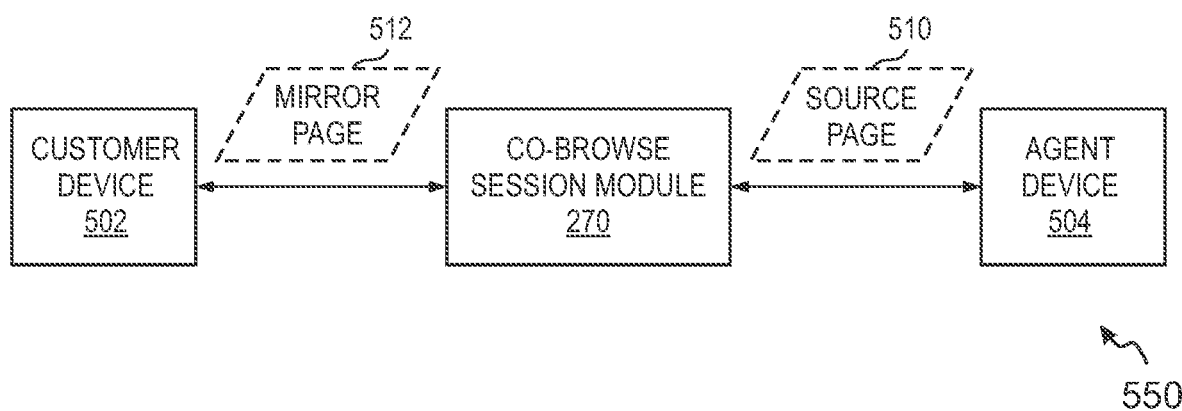
FIG. 5B depicts a block diagram representation to illustrate an example mirroring of Web session content in a co-browsing session in accordance with another embodiment of the invention.

FIG. 5B depicts a block diagram representation 550 to illustrate an example mirroring of Web session content in a co-browsing session in accordance with another embodiment of the invention. As explained above, the co-browse session module 270 is configured to set-up and maintain a co-browsing session between a customer device and an agent device. Accordingly, the block diagram representation 550 shows a customer device 502 and an agent device 504 to be connected to each other in an end-to-end connection by the co-browse session module 270. In the block diagram representation 550, the Web page content viewed on the agent device 504 is shown as a source page 510 and the source page content, as well activities on the source page 510, are mirrored onto the customer device 502, exemplarily shown as a mirror page 512.

In at least some embodiments, an indication that a co-browse session is in progress may be displayed on the Website UI being displayed on the customer device, as well as on the agent console. For example, an indicator in form of a floating widget displaying text 'CO-BROWSE SESSION ON' may be displayed on the electronic devices of the customer and the agent.

Such co-browsing of Web content while the customer is also present in the voice interaction channel precludes disjointed communication between the enterprise and the customer in multiple interaction channels. Moreover, co-browsing the website while simultaneously providing agent guidance on phone enables provisioning of a superior interaction experience to the customer as the agent can involve visual medium to direct the customer to the relevant information, which may not be possible if separate interaction channels were used.

Furthermore, in at least some embodiments, the processor 202 may be configured to generate digital content based on at least one of the ongoing co-browsing session and the interaction between the customer and the agent, and cause display of the digital content by the agent to the customer during the ongoing co-browsing session to provide assistance to the customer. More specifically, the digital content sharing module 280 of the processor 202 is configured to generate and cause display of digital content during the ongoing co-browsing session. The generation of the digital content is further explained hereinafter.

In an illustrative example, the customer may convey the intention for initiating an interaction with the agent prior to the initiation of the co-browsing session. On subsequent detection of the customer presence on the web site, an offer to co-browse the website may be provided to the customer by the agent, as explained with reference to FIGS. 3 and 4. The customer's acceptance of the offer may trigger the co-browsing session between the customer and the agent. In some embodiments, the intention conveyed either explicitly by the customer or implied during the initial voice call interaction may be provided to the digital content sharing module 280, for example by logging of the intention by the agent in the agent console. The digital content sharing module 280 is configured to generate digital content relevant to the interaction based on the expressed or implied intention of the customer. Some examples of the generated digital content may include, but are not limited to, an information snippet, a personalized advertisement, a promotional offer, a customized discount coupon, at least partially filled web form, and the like. Further, the digital content sharing module 280 is configured to cause display of the generated digital content on the agent console to provide an option to the agent to push such tailored content to the customer. If the agent deems the generated digital content to be suitable, the agent may push the generated digital content to the customer during the ongoing co-browsing session. The sharing of the generated digital content will be explained in further detail with reference to FIGS. 6 and 7.

In some embodiments, the digital content may be generated, not just based on the intention of the customer expressed or implied during the initial interaction, but also based on tracking a Web journey of the customer during a current visit of the customer to the website. More specifically, the customer's activity on the website prior to initiation of the co-browsing session and during the ongoing co-browsing session may be tracked in real-time and in an ongoing manner by the prediction module 260. The tracking of the web journey, i.e. a sequence of actions performed by the customer after accessing the website, is further explained hereinafter.

In an illustrative example, content pieces such as images, hyperlinks, URLs, and the like, displayed on the enterprise website may be associated with Hypertext Markup Language (HTML) tags or JavaScript tags that are configured to be invoked upon customer selection of tagged content. The information corresponding to the customer's activity on the enterprise website may then be captured by recording an invoking of the tags in a data gathering server or a Web server, such as the web server 240 (shown in FIG. 2) hosting the enterprise website. In some embodiments, a socket connection may be implemented to capture all information related to the customer activity on the website. The captured customer activity on the website may include information such as Web pages visited, time spent on each Web page, menu options accessed, drop-down options selected or clicked, mouse movements, HTML links which are clicked and which are not clicked, focus events, for example events during which the customer has focused on a link/Web page for a more than a predetermined amount of time, non-focus events, for example choices the customer did not make from information presented to the customer, e.g. products not selected, or non-viewed content derived from scroll history of the customer, touch events, for example events involving a touch gesture on a touch-sensitive device such as a tablet, non-touch events, and the like. In at least one example embodiment, the communication module 208 may be configured to receive such information from the Web server and provision such information to the prediction module 260 of the processor 202.

Further, in at least some embodiments, information related to the customer, such as for example, IP address of the customer, current location co-ordinates, device type, device operating system (OS), device browser, the type of Internet connection, whether cellular or Wi-Fi, and the like, may be also be extracted by the prediction module 260 in communication with the Web server hosting the website. In at least some embodiments, browser cookies, IP address, phone number and the like, may be indicative of whether the customer has previously visited the interaction channel or not. If the customer has previously visited the interaction channel, the prediction module 260 may be caused to retrieve historic interaction data associated with the customer from the database 290 (shown in FIG. 2).

In an embodiment, the prediction module 260 is configured to use text mining algorithms stored in the memory 204 to transform or convert the received information related to the customer and the customer's current and/or past journeys on the website into a more meaningful or useful form. In an illustrative example, the transformation of information may include normalization of content included therein. In some embodiments, the prediction module 260 normalizes information such as phone numbers, email IDs, customer keyword searches on the website, URLs visited, and so on to transform the information. The prediction module 260 is further caused to extract features from the transformed information, i.e. normalized data. In at least one embodiment, the extraction of features from the transformed data may involve converting the transformed information into vectors of predefined length, i.e. a sequence of ones and zeros, representative of captured information therein.

Further, the prediction module 260 is configured to retrieve logic corresponding to at least one classifier associated with intention prediction from the memory 204 to facilitate prediction of an intention, such as a customer intention to purchase a particular product, etc., based on the extracted features. In one embodiment, the extracted features are provided as input parameters to the classifiers to predict customer intention. An example of a customer intention may include an intention to engage in a purchase transaction on the enterprise interaction channel during the current journey on the interaction channel. Another example of the customer intention may be to resolve a credit card payment issue and so on and so forth. In at least one example embodiment, the classifier outcome may be associated with a likelihood measure. For example, an outcome of predicted intention of the customer to perform an action, such as a purchase transaction, may be 'Yes' and may further associated with a likelihood or probability measure of '0.85' indicative of an 85% likelihood of the customer performing the purchase transaction during the current journey.

Accordingly, the prediction module 260 may predict the customer intention based on the ongoing co-browsing session, i.e. by tracking the web journey, and/or based on the interaction between the customer and the agent, i.e. intention explicitly expressed or implied, and provide the predicted intention to the digital content sharing module 280. As explained above, the digital content sharing module 280 is configured to generate digital content relevant to the interaction and cause display of the generated digital content on the agent console to provide an option to the agent to push such tailored content to the customer.

In an illustrative example, an intention of the customer to purchase a laptop may be predicted based on the customer's activity on the website. The digital content sharing module 280 may generate a personalized advertisement displaying a promotional offer on a recently launched laptop brand and the advertisement may then be provided to the customer on the website during the ongoing co-browsing session using the communication module 208. In some embodiments, the agent using the agent console may be configured to access digital content stored in the database 290 and create personalized content based on the predicted intention of the customer using the digital content sharing module 280. The sharing of digital content during the ongoing co-browse session is further explained with reference to FIGS. 6 and 7.

Figure 6:
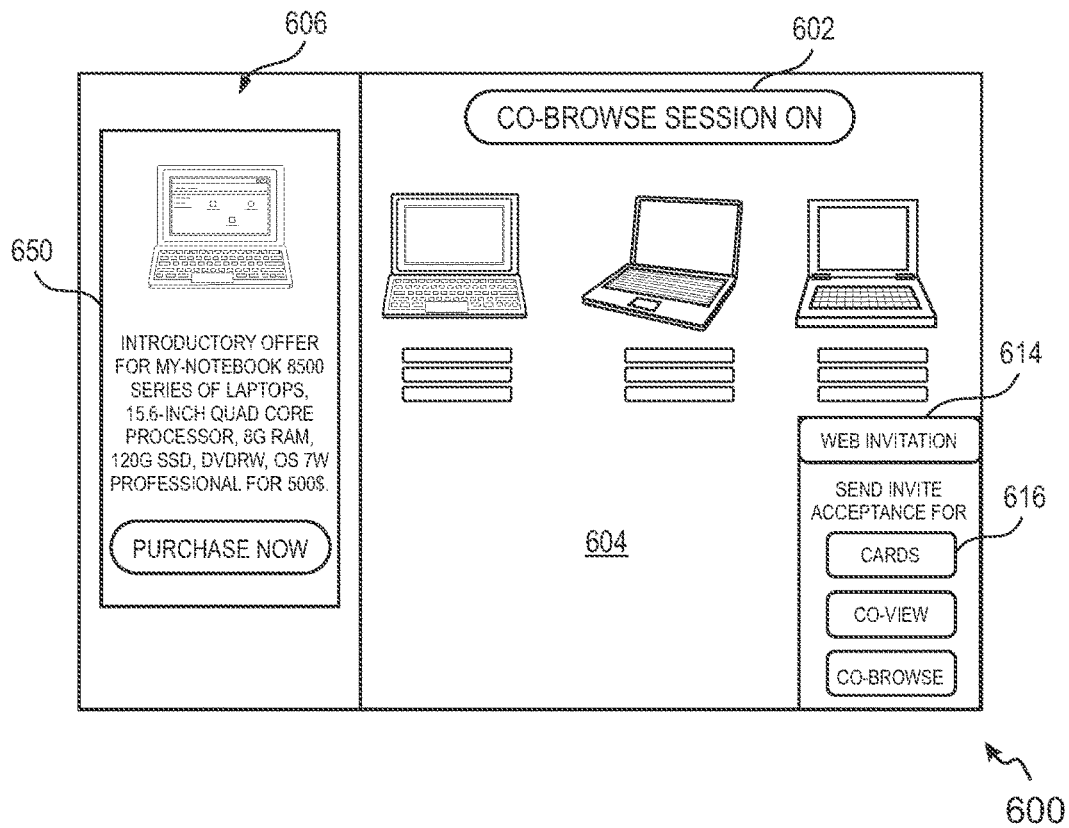
FIG. 6 shows an example representation of a UI associated with an agent console for illustrating a presentation of a card by an agent to a customer during an ongoing co-browsing session in accordance with an embodiment of the invention.

FIG. 6 shows an example representation of a UI 600 associated with an agent console for illustrating a presentation of a card 650 by an agent to a customer during an ongoing co-browsing session in accordance with an embodiment of the invention. As explained with reference to FIGS. 3-4, a customer may be engaged in voice call interaction with an agent associated with an enterprise and the agent may request initiation of co-browsing session. After customer acceptance of the request, a co-browsing session may be initiated, wherein the activity of the customer on the customer device is mirrored on the UI, such as the UI 600 associated with the agent console being displayed on the agent device. After the initiation of the co-browsing session, a floating widget 602 is displayed on the UI 600 of the agent console to indicate that the co-browse session is in progress, i.e. the co-browsing session is ongoing. Furthermore, the Web page being currently viewed by the customer is mirrored in form of a Web page 604 as shown in the UI 600.

Furthermore, the UI 600 includes a portion 606 wherein information such as customer's predicted intention, relevant digital content such as promotional offer recommendations, etc. is displayed. As explained with reference to FIG. 2, the prediction module 260 is configured to predict intention of the customer based on at least one of ongoing co-browsing session and the customer's interaction with the agent. Further, the digital content sharing module 280 is configured to retrieve relevant digital content from the database 290 based on the predicted intention and create personalized digital content for the customer. The personalized digital content may then be shared as shown in form of the card 650 displayed in the portion 606 of the agent console.

In an illustrative example, the prediction module 260 may have predicted the customer's intention as an intent to purchase a laptop. Accordingly, the digital content sharing module 280 may create a personalized digital content, such as the card 650, which is depicted to be advertisement showing content for a promotional offer on a laptop. The agent may then choose to make changes to the content of the card 650 displayed in the portion 606 or share it as-is during the ongoing co-browsing session. The UI 600 is depicted to display a widget, such as a widget 614, including a button 616 configured to enable the agent to share the card 650 with the customer during the ongoing co-browsing session, i.e. while the co-browsing session is in progress. The agent may select the button 616 to share the card with the customer during the ongoing co-browsing session. An example UI displaying the shared personalized digital content in form of the card 650 to the customer is shown in FIG. 7.

Figure 7:
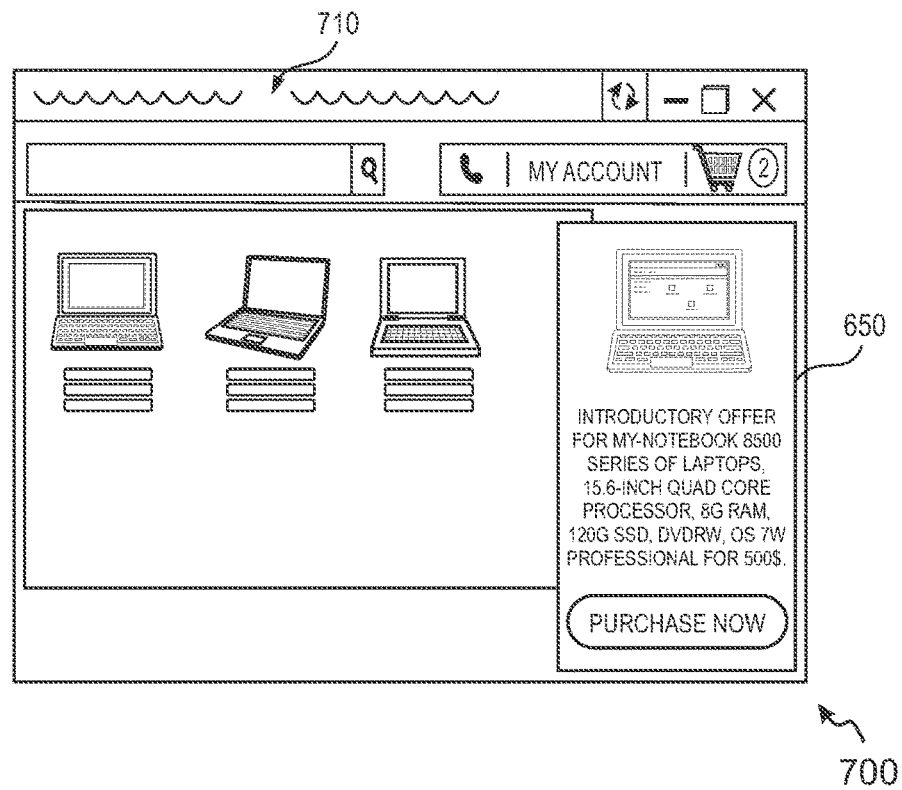
FIG. 7 shows an example representation of a UI associated with an enterprise Website for illustrating a presentation of personalized digital content to a customer during an ongoing co-browsing session with the enterprise agent in accordance with an embodiment of the invention.

FIG. 7 shows an example representation of a UI 700 associated with an enterprise Website 710 for illustrating a presentation of personalized digital content to a customer during an ongoing co-browsing session with the enterprise agent in accordance with an example embodiment. The UI 700 associated with the enterprise website 710 is displayed on a display screen of the customer device, for example a personal computer, a smartphone, and the like. As explained above, the customer is engaged in a voice call interaction with the enterprise agent while also being engaged in a co-browsing session on the enterprise website with the agent. Further, as explained with reference to FIG. 6, the agent may wish to share personalized digital content such as the card 650 with the customer during the ongoing co-browsing session. The agent may select the button 616 on the widget 614 to provide the card to the customer. FIG. 7 depicts the card 650 being displayed on the UI 700 associated with the enterprise website 710. The card 650 is depicted to offer options to the customer to make a purchase transaction for the laptop model displayed in the card 650.

In some example scenarios, the customer may not be interested in the model displayed in the card 650. In such a scenario, the agent may further discuss the customer's requirements on the voice call interaction and provision other cards that may be of interest to the customer. If the customer wishes to proceed with the purchase transaction, then the agent may assist the customer in completing the purchase transaction, by prefilling form fields associated with card related transactions. In some example embodiments, the agent may also provide cards that up-sell or cross-sell products to the customer if the customer has displayed interest in purchasing an enterprise product.

The sharing of digital content, such as cards, is not limited to agent initiation only. In at least some embodiments, a widget such as the widget 614 including the button 616 (shown in FIG. 6) may be displayed on the UI 700 of the enterprise website 710 during the ongoing co-browsing session. The customer may share personal content, i.e. content owned by the customer and relevant to the interaction, such as images, documents, media files, or other content pieces during the ongoing co-browsing session with the agent.

The customer or the agent may terminate one channel, for example the co-browsing session or the voice call interaction, at any point during the ongoing interaction. For example, in one embodiment, the voice call interaction between the customer and the agent is continued during the co-browsing of the website by the customer and the agent. Alternatively, in one embodiment, the voice call interaction between the customer and the agent is discontinued subsequent to initiation of the co-browsing session.

Although the co-browsing session is explained so far, to have initiated from a voice call interaction and thereafter the personalized digital content is shared with the customer during the ongoing co-browsing session, in at least some embodiments, the co-browsing session may also be initiated subsequent to sharing of personalized digital content. As explained with reference to FIGS. 2 to 7, customer activity on the website is tracked and customer intention is predicted on a real-time basis. The digital content sharing module 280 creates personalized digital content, such as the card 650 shown in FIG. 6, based on the predicted intention of the customer. In at least one example embodiment, the digital content sharing module 280 may be configured to cause display of the personalized digital content in form of a pop-up notification to the customer during the customer's browsing session on the website. The pop-up notification may include a message such as 'INTERESTED IN THIS OFFER!! TALK TO OUR AGENT BY CLICKING HERE!!' The customer selection of the message may initiate a chat interaction with the customer on the website and the agent may propose a co-browsing session to the customer on the chat interaction to better assist the customer. An example chat interaction between the customer and the agent is shown in FIG. 8.

Figure 8:
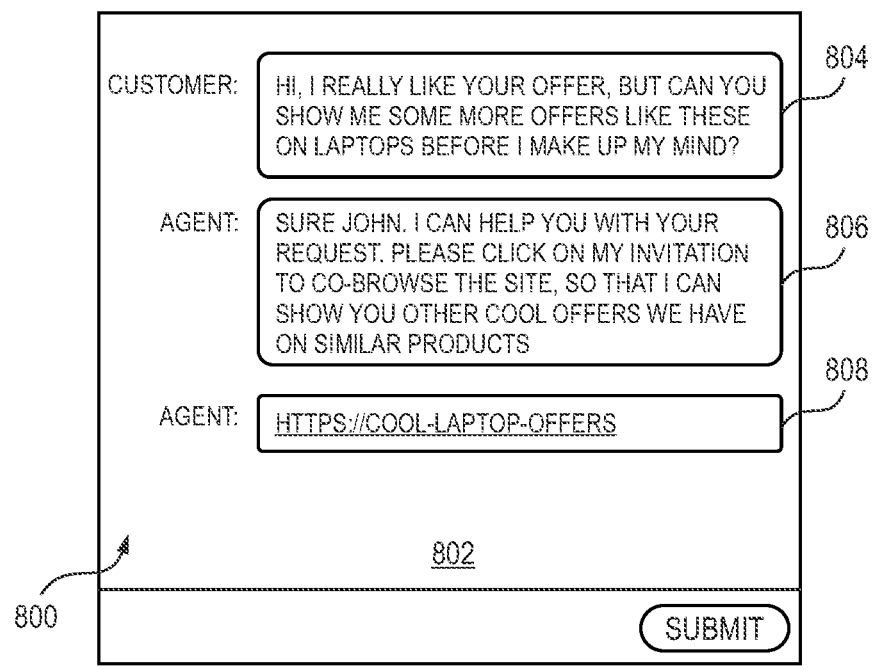
FIG. 8 shows a simplified representation of an example chat interaction between an agent and a customer for illustrating an initiation of a co-browsing session in accordance with an embodiment of the invention.

Referring now to FIG. 8, a simplified representation of an example chat interaction 800 between an agent and a customer is shown for illustrating initiation of a co-browsing session in accordance with an embodiment of the invention. As explained above, a customer browsing an enterprise website may be presented with personalized digital content, such as advertisement, during the Web journey. The customer may be interested in the advertisement and may initiate a chat interaction by clicking on the advertisement or using an agent chat widget displayed on the website. A chat console may be displayed on the website subsequent to the customer providing a click or a touch input on the advertisement or on the agent chat widget, such as the widget 116 shown in FIG. 1.

The UI of the chat console is exemplarily depicted as an UI 802 in FIG. 8. The UI 802 further displays textual content associated with the example chat interaction 800 between the customer and the agent. The agent conversational lines are exemplarily depicted to be labeled with term 'Agent,' whereas the customer conversational lines are exemplarily depicted to be labeled with term 'Customer' for illustration purposes. As can be seen from the chat interaction, the customer is depicted to have provided an input 804 stating 'HI, I REALLY LIKE YOUR OFFER, BUT CAN YOU SHOW ME SOME MORE OFFERS LIKE THESE ON LAPTOPS BEFORE I MAKE UP MY MIND?' The agent is exemplarily depicted to have provided a response 806 'SURE JOHN. I CAN HELP YOU WITH YOUR REQUEST. PLEASE CLICK ON MY INVITATION TO CO-BROWSE THE SITE, SO THAT I CAN SHOW YOU OTHER COOL OFFERS WE HAVE ON SIMILAR PRODUCTS.' The response 806 may be followed a Weblink 808 'HTTPS://COOL-LAPTOP-OFFERS.' The customer may click on the link to initiate a co-browse session. Thereafter, the agent may display digital content in form of other promotional offers and discount coupons to assist the customer.

As explained above, sharing of personalized digital content during a co-browsing session avoids the need to have separate disjointed communication between customers and agents on separate enterprise interaction channels. Moreover, a quality of interaction experience is improved manifold as the customers get desired assistance in a convenient manner without engaging in multiple to-and-fro communication.

A method for facilitating interactions between customers and agents of an enterprise is explained next with reference to FIG. 9.

Figure 9:
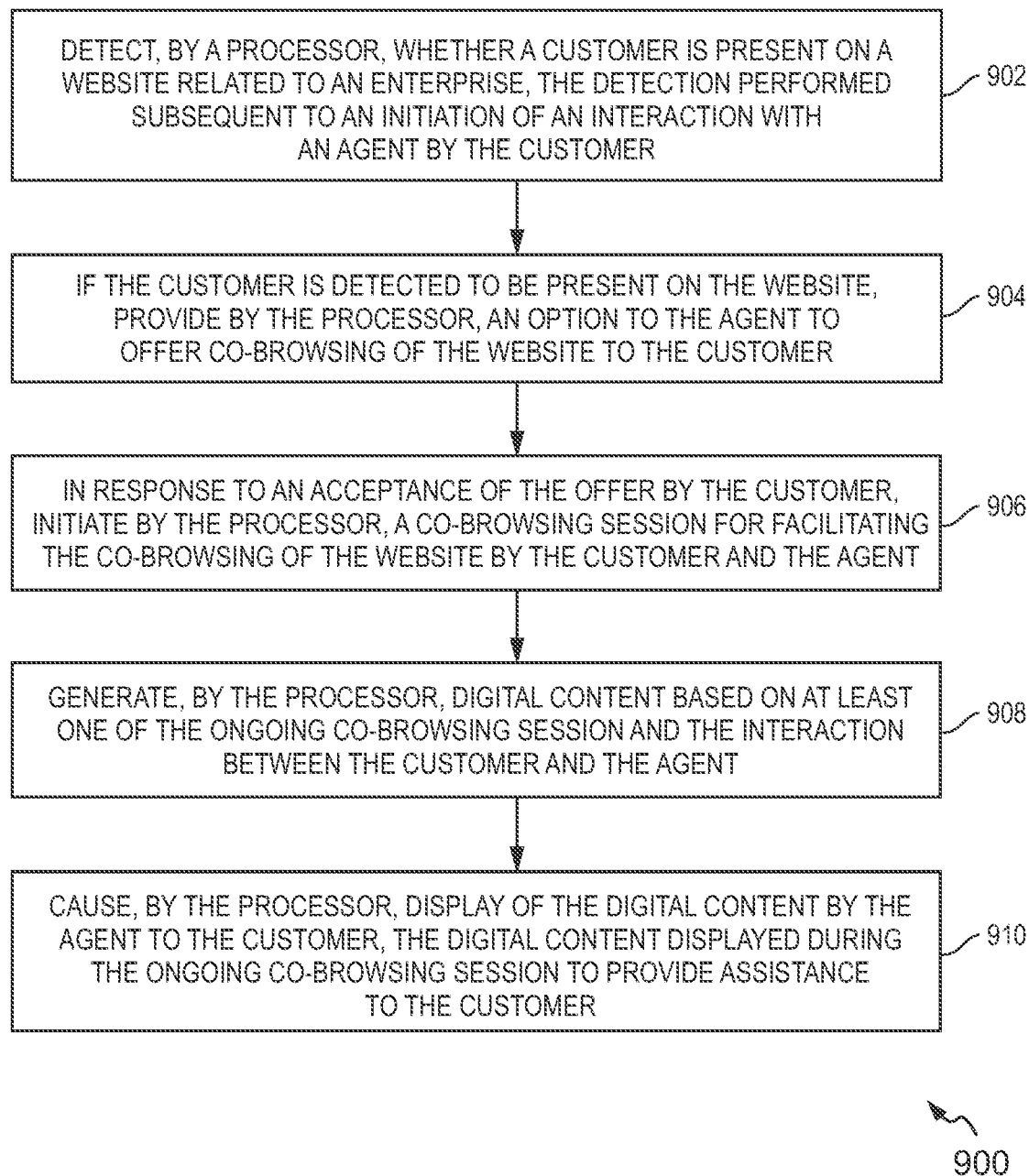
FIG. 9 shows a flow diagram of a method for facilitating interactions between customers and agents of an enterprise in accordance with an embodiment of the invention.

FIG. 9 shows a flow diagram of a method 900 for facilitating interactions between customers and agents of an enterprise in accordance with an embodiment of the invention. The method 900 depicted in the flow diagram may be executed by, for example, the apparatus 200 explained with reference to FIGS. 2 to 8. Operations of the flowchart, and combinations of operation in the flowchart, may be implemented by, for example, hardware, firmware, a processor, circuitry and/or a different device associated with the execution of software that includes one or more computer program instructions. The operations of the method 900 are described herein with help of the apparatus 200. The operations of the method 900 can be described and/or practiced by using any system other than the apparatus 200. The method 900 starts at operation 902.

At operation 902 of the method 900, it is detected whether a customer is present on a website related to the enterprise. The detection is performed by a processor, such as the processor 202 explained with reference to FIGS. 2 to 8, subsequent to an initiation of an interaction with an agent by the customer. More specifically, the providing of a Web page in response to a HTTP request triggered by a customer input of an URL seeking access to the website may be recorded in a Web server to facilitate detection of the customer's presence on the website. In one embodiment, the detection of the customer's presence on the website may be performed subsequent to initiation of a voice call interaction by the customer. In one example scenario, the customer may call the customer support center to initiate the voice call interaction with the agent.

If the customer is detected to be present on the website, at operation 904 of the method 900, an option is provided to the agent by the processor to offer co-browsing of the website to the customer. An example option provided to the agent in an agent console is shown in form of a button 308 in the widget box 302 in FIG. 3. The agent may select that option to offer co-browsing of the website to the customer.

In response to an acceptance of the offer by the customer, at operation 906 of the method 900, a co-browsing session for facilitating the co-browsing of the website by the customer and the agent is initiated by the processor. More specifically, an end-to-end connection between the browsers in the agent device and the customer device is enabled to facilitate a co-browsing session between the customer and the agent. In one embodiment, the processor implements an end-to-end proxy-based HTML passing connection between the browsers in the customer device and the agent device, such that a Web page (also referred to herein as a hypertext markup language or HTML page) being displayed on the customer device and all subsequent browsing activity being performed on the customer device is mirrored on the agent's electronic device and vice versa. Each customer activity on a source page, i.e. a Web page that the customer is currently active on, such as cursor movement, selection of an image, up-scrolling and down-scrolling of content, selection of drop-down menus, etc. are also displayed in substantially real-time, i.e. with negligible delay, on the agent device. In some example scenarios, the Web activity being performed on the agent device is mirrored onto the customer device during the ongoing co-browsing session. Such a scenario may arise when the agent intends to show how to access a particular piece of information on the website, or how to fill up a Web form, and the like. The initiation of the co-browsing session is explained with reference to FIGS. 4, 5A and 5B.

At operation 908 of the method 900, digital content is generated by the processor based on at least one of the ongoing co-browsing session and the interaction between the customer and the agent. In an illustrative example, the customer may convey the intention for initiating an interaction with the agent prior to the initiation of the co-browsing session. On subsequent detection of the customer presence on the web site, an offer to co-browse the website may be provided to the customer by the agent as explained with reference to FIGS. 3 and 4. The customer's acceptance of the offer may trigger the co-browsing session between the customer and the agent. In some embodiments, the intention conveyed either explicitly by the customer or implied during the initial voice call interaction may be conveyed to the agent and the processor 202. The processor 202 is configured to generate digital content relevant to the interaction based on the expressed or implied intention of the customer. Some examples of the generated digital content may include, but are not limited to, an information snippet, a personalized advertisement, a promotional offer, a customized discount coupon, at least partially filled web form, and the like. In some embodiments, the digital content may be generated, not just based on the intention of the customer expressed or implied during the initial interaction, but also based on tracking a web journey of the customer during a current visit of the customer to the website. More specifically, the customer's activity on the website prior to initiation of the co-browsing session and during the ongoing co-browsing session may be tracked in real-time and in an ongoing manner and the customer's intention may be predicted based on the tracked information. The prediction of customer's intention and the subsequent generation of the digital content may be performed as explained with reference to FIGS. 2 to 6 and is not explained again herein.

At operation 910 of the method 900, display of the digital content by the agent to the customer is caused by the processor. The digital content is displayed during the ongoing co-browsing session to provide assistance to the customer. The sharing of the generated digital content with the agent in the agent console and subsequent presentation of the digital content by the agent to the customer may be performed, as explained with reference to FIGS. 6 and 7.

In some embodiments, the customer or the agent may terminate one channel, for example the co-browsing session or the voice call interaction, at any point during the ongoing interaction. For example, in one embodiment, the voice call interaction between the customer and the agent is continued during the co-browsing of the website by the customer and the agent. Alternatively, in one embodiment, the voice call interaction between the customer and the agent is discontinued subsequent to initiation of the co-browsing session. The method 900 ends at operation 910.

Figure 10:
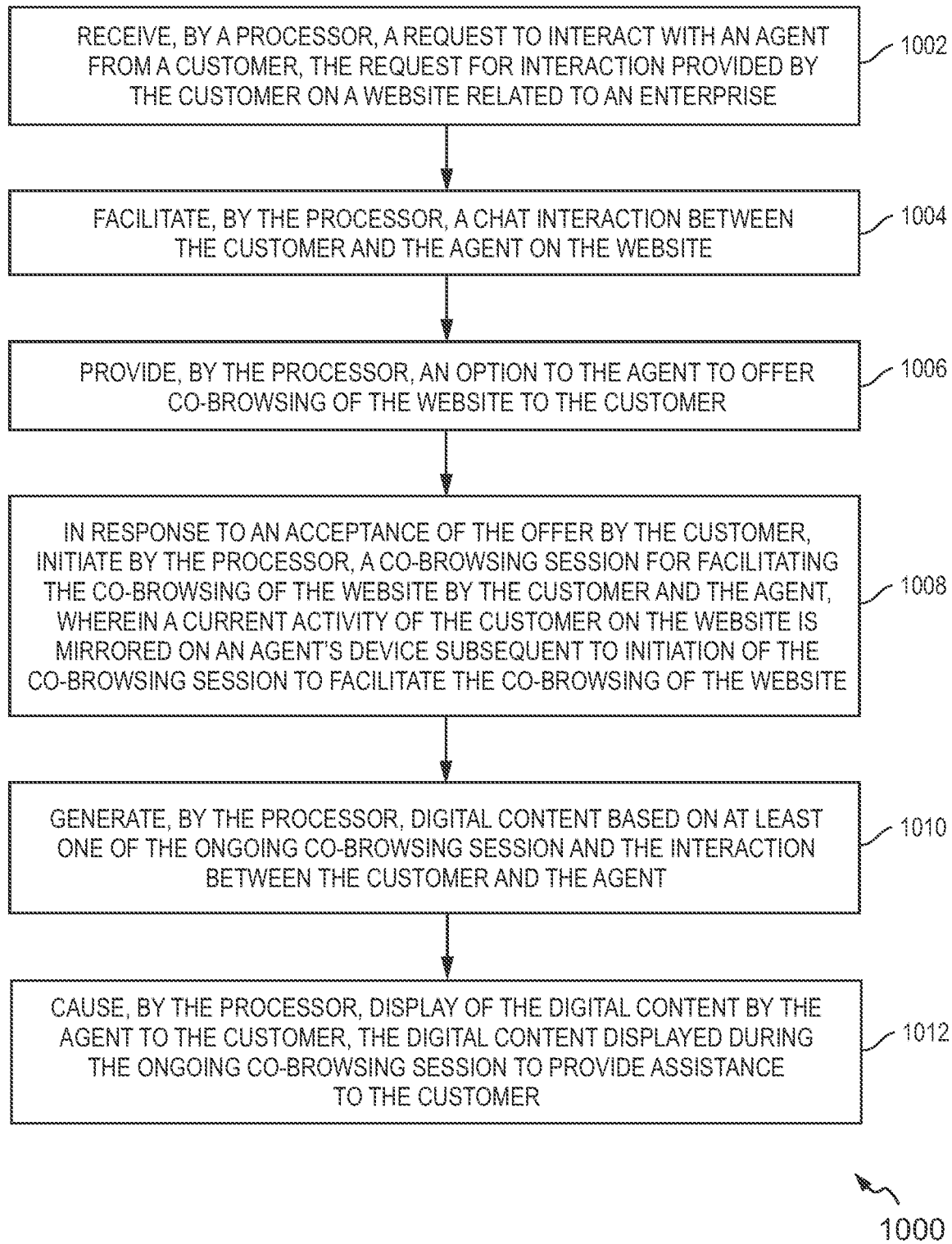
FIG. 10 shows a flow diagram of a method for facilitating interactions between customers and agents of an enterprise in accordance with another embodiment of the invention.

FIG. 10 shows a flow diagram of a method 1000 for facilitating interaction between customers and agents of an enterprise in accordance with another embodiment of the invention. The various steps and/or operations of the flow diagram, and combinations of steps/operations in the flow diagram, may be implemented by, for example, hardware, firmware, a processor, circuitry and/or by an apparatus such as the apparatus 200 of FIG. 2 and/or by a different device associated with the execution of software that includes one or more computer program instructions. The method 1000 starts at operation 1002.

At operation 1002 of the method 1000, a request to interact with an agent from a customer is received by a processor such as the processor 202 of FIG. 2. The request for interaction is provided by the customer on a website related to the enterprise. The providing of the request of interaction by the customer on the website may be performed as explained with reference to FIG. 8.

At operation 1004 of the method 1000, a chat interaction is facilitated between the customer and the agent on the web site by the processor. The initiation of the chat interaction is explained with reference to FIG. 8.

At operation 1006 of the method 1000, an option is provided to the agent by the processor to offer co-browsing of the web site to the customer. In response to an acceptance of the offer by the customer, at operation 1008 of the method 1000, a co-browsing session is initiated by the processor for facilitating the co-browsing of the web site by the customer and the agent. A current activity of the customer on the web site is mirrored on an agent's device subsequent to initiation of the co-browsing session to facilitate the co-browsing of the website. The providing of the option and the initiation of the co-browsing session may be performed as explained with reference to operations 904 and 906 of the method 900 and are not described again herein.

At operation 1010 of the method 1000, digital content is generated by the processor based on at least one of the ongoing co-browsing session and the interaction between the customer and the agent. At operation 1012 of the method 1000, display of the digital content by the agent to the customer is caused by the processor. The digital content is displayed during the ongoing co-browsing session to provide assistance to the customer. The generation of the digital content and the display of the generated digital content may be performed as explained with reference to operations 908 and 910 of the method 900 and are not described again herein.

Various embodiments disclosed herein provide numerous advantages. The techniques disclosed herein suggest techniques for facilitating interactions between customers and agents of an enterprise, while precluding disjointed or to-and-fro communication on multiple interaction channels. To that effect, co-browsing of Web content by a customer and agent is facilitated. Moreover, agents are enabled to push personalized digital content, such as personalized product offers (also referred to herein as 'cards') during the co-browsing session. As a result, of combining co-browsing with sharing of personalized digital content in a single session, a quality of interaction experience is improved manifold.

In many conventional mechanisms, the personalized digital content is displayed to the customer on the website. However, if the customer chooses to ignore the content, then there is no mechanism to engage with the customer. In some cases, the chat agents show Ads within the chat window. However, there is not enough context for the chat agent to show some other offer if the customer did not like the Ad content. Various techniques disclosed herein provide option to browse generic content on the website. Even though the customer has not opted for an offer, other content make be displayed to the customer to re-engage the customer. Further, the browsing may be also tailored to display specific content or customized browsing may be switched with generic browsing to help the customer identify the best product/service offered by the enterprise. Such a solution improves the customer experience manifold and also helps the enterprise to increase its sales.

Although the invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry, for example complementary metal oxide semiconductor (CMOS) based logic circuitry; firmware, software; and/or any combination of hardware, firmware, and/or software, for example embodied in a machine-readable medium. For example, the apparatuses and methods may be embodied using transistors, logic gates, and electrical circuits, for example application specific integrated circuit (ASIC) circuitry, and/or in Digital Signal Processor (DSP) circuitry.

Particularly, the apparatus 200 and its various components such as the processor 202 and its modules described from FIGS. 2 to 8, the memory 204, the I/O module 206, the communication module 208 and the centralized circuit system 210 may be enabled using software and/or using transistors, logic gates, and electrical circuits, for example integrated circuit circuitry such as ASIC circuitry. Various embodiments of the invention may include one or more computer programs stored or otherwise embodied on a computer-readable medium, wherein the computer programs are configured to cause a processor or computer to perform one or more operations, for example operations explained herein with reference to FIGS. 9 and 10). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media, such as floppy disks, magnetic tapes, hard disk drives, etc.; optical magnetic storage media, e.g. magneto-optical disks, CD-ROM (compact disc read only memory), CD-R (compact disc recordable), CD-R/W (compact disc rewritable), DVD (Digital Versatile Disc), BD (Blu-ray (registered trademark) Disc); and semiconductor memories, such as mask ROM, PROM (programmable ROM), EPROM (erasable PROM), flash ROM, RAM (random access memory), etc. Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line, e.g. electric wires, and optical fibers, or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method for facilitating interactions between customers and agents of an enterprise while precluding disjointed or to-and-fro communication on multiple interaction channels, comprising:
   a customer entering a uniform resource locator (URL) associated with an enterprise website in a Web browser application to provision a hypertext transfer protocol (HTTP) request to a Web server for accessing a Web page associated with the enterprise website;
   in response to the customer's HTTP request, the Web server provisioning a Web page associated with the enterprise website to a customer device, said customer device displaying the Web page in a user interface (UI) associated with a Web browser application;
   a communication module receiving information related to the customer's HTTP request and subsequently provisioning the Web page from the Web server;

said communication module providing information to a prediction module to detect presence of the customer on the enterprise website, the detection performed subsequent to an initiation of an interaction with an agent by the customer;

when the customer is detected to be present on the website, the prediction module signaling said information by using an API call to a co-browse session module;

responsive to said prediction module signaling, the co-browse session providing an option to an agent console for the agent to offer co-browsing of the website to the customer;

determining that the agent has selected the option to offer co-browsing of the website to the customer;

displaying a notification to the customer on a UI associated with the enterprise website being displayed on the customer's device, said notification seeking approval of the customer for initiating a co-browsing session;

in response to an acceptance of the co-browsing offer by the customer, initiating by the co-browse session module, a co-browsing session for facilitating the co-browsing of the website by the customer and the agent;

combining co-browsing with sharing of personalized digital content in a single session by generating, by the co-browse session module, digital content based on at least one of an ongoing co-browsing session and the interaction between the customer and the agent;

transmitting from the agent to the customer, by the co-browse session module, said digital content; and causing, by the co-browse session module, display of the digital content by the agent to the customer, the digital content displayed during the ongoing co-browsing session to provide assistance to the customer.

2. The method as claimed in claim 1, the interaction initiated with the agent by the customer comprising:
the customer by calling a customer support center associated with the enterprise to initiate a voice call interaction.

3. The method as claimed in claim 2, further comprising:
continuing the voice call interaction between the customer and the agent during the co-browsing of the website by the customer and the agent.

4. The method as claimed in claim 2, further comprising:
discontinuing the voice call interaction between the customer and the agent subsequent to initiation of the co-browsing session.

5. The method as claimed in claim 1, further comprising:
mirroring a current activity of the customer on the website on an agent's device subsequent to initiation of the co-browsing session to facilitate the co-browsing of the website.

6. The method as claimed in claim 1, further comprising:
mirroring a current activity of the agent on the website on a customer's device subsequent to initiation of the co-browsing session to facilitate the co-browsing of the website.

7. The method as claimed in claim 1, the generated digital content comprising:
at least one of an information snippet, a personalized advertisement, a promotional offer, a customized discount coupon, and at least partially filled Web form.

8. The method as claimed in claim 1, further comprising:
tracking a web journey of the customer during a current visit of the customer to the website;
predicting, by the processor, at least one intention of the customer using the tracked web journey; and
generating the digital content based, at least in part, on the predicted at least one intention.

9. The method as claimed in claim 1, the interaction initiated with the agent by the customer comprising:
a chat interaction, the chat interaction initiated by the customer on a chat interaction channel associated with the enterprise.

10. The method as claimed in claim 1, further comprising:
causing a display of an indicator on at least one of a customer's device and an agent's device engaged in the co-browsing session; and
the indicator providing an indication of the co-browsing session being in progress.

11. The method as claimed in claim 1, further comprising:
enabling the customer to share personal content with the agent during the ongoing co-browsing session, the personal content comprising at least one of an image, a document, and a media file.

12. An apparatus for facilitating interactions between customers and agents of an enterprise while precluding disjointed or to-and-fro communication on multiple interaction channels, the apparatus comprising:
a memory for storing instructions; and
a processor configured to execute the instructions and thereby cause the apparatus to at least perform:
in response to a customer entering a uniform resource locator (URL) associated with an enterprise website in a Web browser application to provision a hypertext transfer protocol (HTTP) request to a Web server for accessing a Web page associated with the enterprise website, provision a Web page associated with the enterprise website to a customer device, wherein said customer device displays the Web page in a user interface (UI) associated with a Web browser application;
receive information related to the customer's HTTP request and subsequently provision the Web page from the Web server;
provide information to a prediction module to detect when a customer is present on a website related to the enterprise, the detection performed subsequent to an initiation of an interaction with an agent by the customer;
when the customer is detected to be present on the website, provide an option to an agent console for the agent to offer co-browsing of the website to the customer;
determine that the agent has selected the option to offer co-browsing of the website to the customer;
display a notification to the customer on a UI associated with the enterprise website being displayed on the customer's device, wherein said notification seeks customer approval for initiating a co-browsing session;
in response to an acceptance of the co-browsing offer by the customer, initiate a co-browsing session for facilitating the co-browsing of the website by the customer and the agent;
combine co-browsing with sharing of personalized digital content in a single session by generating digital content based on at least one of an ongoing co-browsing session and the interaction between the customer and the agent;
transmit from the agent to the customer said digital content; and cause display of the digital content by the agent to the customer, the digital content displayed during the ongoing co-browsing session to provide assistance to the customer.

13. The apparatus as claimed in claim 12, the interaction initiated with the agent by the customer comprising:
the customer by calling a customer support center associated with the enterprise to initiate a voice call interaction.

14. The apparatus as claimed in claim 12, wherein the apparatus is further caused to:
mirror a current activity of the customer on the website on an agent's device subsequent to initiation of the co-browsing session to facilitate the co-browsing of the website.

15. The apparatus as claimed in claim 12, the generated digital content comprising:
at least one of an information snippet, a personalized advertisement, a promotional offer, a customized discount coupon, and at least partially filled web form.

16. The apparatus as claimed in claim 12, wherein the apparatus is further caused to:
track a web journey of the customer during a current visit of the customer to the website;
predict at least one intention of the customer using the tracked web journey; and
generate the digital content based, at least in part, on the predicted at least one intention.

17. The apparatus as claimed in claim 12, wherein the apparatus is further caused to:
cause display of an indicator on at least one of a customer's device and an agent's device engaged in the co-browsing session; and
the indicator providing an indication of the co-browsing session being in progress.

18. A computer-implemented method for facilitating interactions between customers and agents of an enterprise while precluding disjointed or to-and-fro communication on multiple interaction channels, the method comprising:
receiving, by a communication module, a request to interact with an agent from a customer, the request for interaction provided by the customer on a website related to the enterprise;
in response to the customer's request, a Web server provisioning a Web page associated with the enterprise website to a customer device, said customer device displaying the Web page in a user interface (UI) associated with a Web browser application;
facilitating, by the communication module, a chat interaction between the customer and the agent on the website;
providing, by the communication module, an option to the agent to offer co-browsing of the website to the customer;
determining that the agent has selected the option to offer co-browsing of the website to the customer;
displaying a notification to the customer on a user interface (UI) associated with the website related to the enterprise being displayed on a customer device, said notification seeking approval of the customer for initiating a co-browsing session;
in response to an acceptance of the co-browsing offer by the customer, initiating by a co-browse session module, a co-browsing session for facilitating the co-browsing of the website by the customer and the agent;
mirroring a current activity of the customer on the website on an agent's device subsequent to initiation of the co-browsing session to facilitate the co-browsing of the website;
combining co-browsing with sharing of personalized digital content in a single session by generating, by the co-browse session module, digital content based on at least one of an ongoing co-browsing session and the chat interaction between the customer and the agent;
transmitting from the agent to the customer, by the co-browse session module, said digital content; and
causing, by the co-browse session module, display of the digital content by the agent to the customer during the ongoing co-browsing session to provide assistance to the customer.

19. The method as claimed in claim 18, further comprising:
enabling the customer, by the co-browse session module, to share personal content with the agent during the ongoing co-browsing session, the personal content comprising at least one of an image, a document and a media file.

20. The method as claimed in claim 18, further comprising:
tracking, by a processor, a web journey of the customer during a current visit of the customer to the website;
predicting, by the processor, at least one intention of the customer using the tracked web journey; and
generating the digital content is generated based, at least in part, on the predicted at least one intention, wherein the generated digital content corresponds to at least one of an information snippet, a personalized advertisement, a promotional offer, a customized discount coupon, and at least partially filled web form.

* * * * *